(12) United States Patent
Amamiya

(10) Patent No.: US 7,172,050 B2
(45) Date of Patent: Feb. 6, 2007

(54) ARRANGEMENT OF OPERATING PORTIONS FOR INDUSTRIAL VEHICLE

(75) Inventor: Yoshiyuki Amamiya, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 146 days.

(21) Appl. No.: 10/401,932

(22) Filed: Mar. 28, 2003

(65) Prior Publication Data
US 2003/0188912 A1    Oct. 9, 2003

(30) Foreign Application Priority Data
Apr. 3, 2002  (JP) .......................... P2002-101691

(51) Int. Cl.
*B60K 26/00*   (2006.01)

(52) U.S. Cl. ...................... 180/315; 187/224
(58) Field of Classification Search ............... 180/315, 180/324, 329, 331, 333, 334; 297/217.1, 297/217.3, 411.2; 187/222, 224; 701/50
See application file for complete search history.

(56) References Cited

U.S. PATENT DOCUMENTS

| | | | | |
|---|---|---|---|---|
| 3,703,931 A * | 11/1972 | Page et al. | ............... | 172/4.5 |
| 4,097,085 A * | 6/1978 | Nelson | ............... | 180/329 |
| 4,200,166 A * | 4/1980 | Hansen | ............... | 180/315 |
| 5,363,934 A * | 11/1994 | Edmund et al. | ............... | 180/6.5 |
| 5,938,282 A * | 8/1999 | Epple | ............... | 180/315 |
| 6,039,141 A * | 3/2000 | Denny | ............... | 180/329 |
| 6,106,398 A * | 8/2000 | Davis | ............... | 463/38 |
| 6,634,453 B2 * | 10/2003 | Arthur et al. | ............... | 180/315 |
| 7,018,158 B2 * | 3/2006 | Amamiya et al. | ............... | 414/636 |

FOREIGN PATENT DOCUMENTS

| | | | |
|---|---|---|---|
| DE | 40100422 | | 1/2001 |
| JP | 08099800 A | * | 4/1996 |

* cited by examiner

*Primary Examiner*—David R. Dunn
(74) *Attorney, Agent, or Firm*—Morgan & Finnegan, L.L.P.

(57) ABSTRACT

An industrial vehicle includes an armrest and a plurality of operating members. The armrest extends in a front-and-rear direction of the vehicle. The operating members are arranged in front of the armrest. At least two of the operating members each have an operating portion. The operating portions are arranged along an operational orbit of an operator's hand in a state that the operator's arm is rested on the armrest.

11 Claims, 6 Drawing Sheets

ARRANGEMENT OF OPERATING PORTIONS FOR INDUSTRIAL VEHICLE

BACKGROUND OF THE INVENTION

The present invention relates to an industrial vehicle having a plurality of operating members for driving and operating the vehicle, the operating members being suitably arranged for an operator.

As a typical industrial vehicle, a following forklift truck is known. The forklift truck has a plurality of operating levers or a plurality of operating members for driving and operating the vehicle, and the operating levers are arranged on a panel. In general, these operating levers are linearly arranged on the panel. On the other hand, a forklift truck has an armrest for supporting an operator's arm that operates the operating levers in a such manner that the fatigue of the operator is reduced. When the operator operates the operating levers in a state that the operator's arm is rested on the armrest, however, the linear arrangement of the operating levers is not harmonized with the movement of the operator's hand and finger. Therefore, in the structure that the plurality of operating levers is linearly arranged, there is a limit to reduce the fatigue of the operator, whose arm is rested on the armrest.

SUMMARY OF THE INVENTION

The present invention is directed to an industrial vehicle whose operating members are effectively structured to reduce the fatigue of an operator.

The present invention has a first feature. An industrial vehicle includes an armrest and a plurality of operating members. The armrest extends in a front-and-rear direction of the vehicle. The operating members are arranged in front of the armrest. At least two of the operating members each have an operating portion. The operating portions are arranged along an operational orbit of an operator's hand in a state that the operator's arm is rested on the armrest.

The present invention has a second feature. An industrial vehicle includes an armrest and a plurality of operating members. The armrest extends in a front-and-rear direction of the vehicle. The operating portions are arranged in an arched line whose center is located at a predetermined reference point on the armrest.

The present invention has a third feature. A method of arranging operating portions for an industrial vehicle includes the steps of putting an operator's arm on an armrest, drawing an operational orbit of the operator's hand, and arranging the operating portions along the operational orbit.

The present invention has a fourth feature. A method of arranging operating portions for an industrial vehicle includes the steps of locating a predetermined reference point on an armrest, drawing an arched line with the predetermined reference point for its center, and arranging the operating portions in the arched line.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
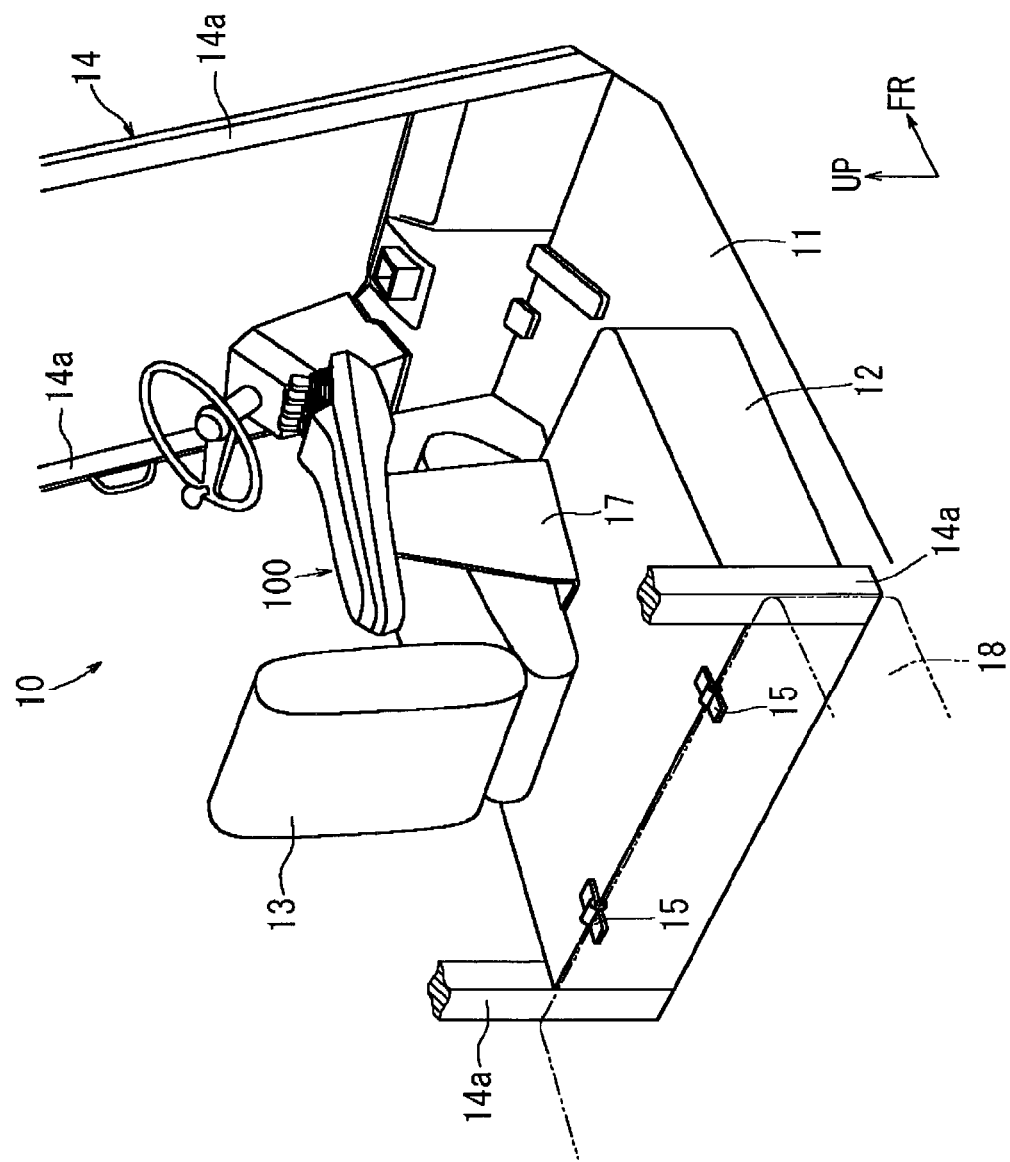
FIG. 1 is a partial perspective view illustrating a forklift truck 10 according to a preferred embodiment of the present invention.
Figure 2:
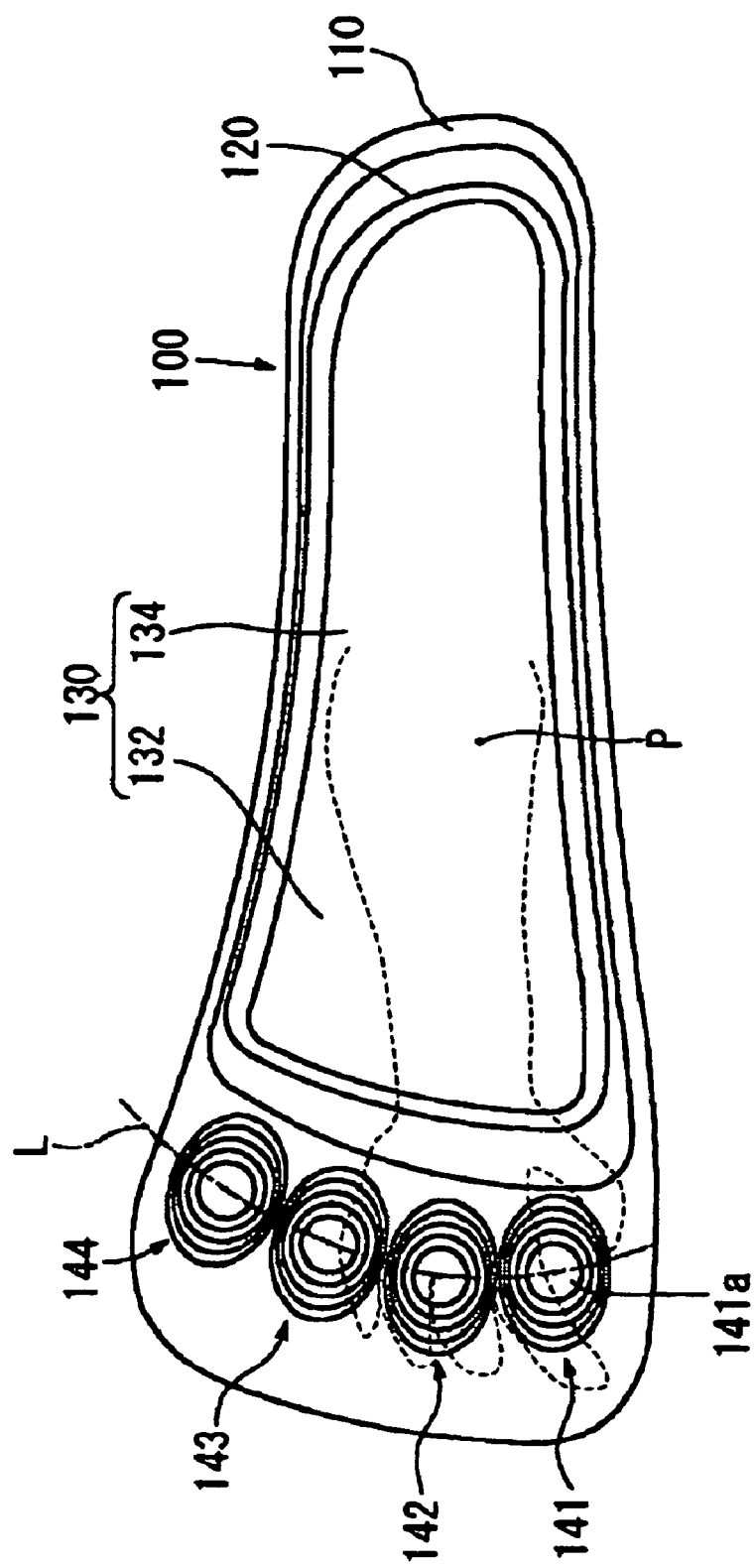
FIG. 2 is an enlarged plane view illustrating an armrest 100 in FIG. 1.
Figure 3:
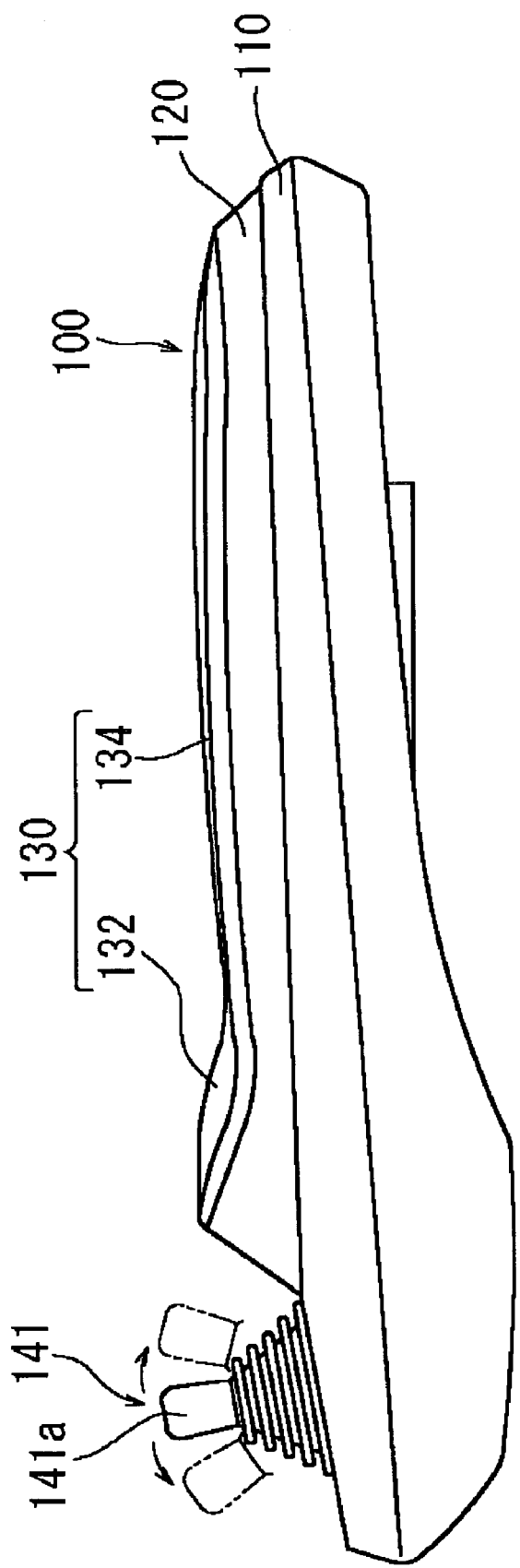
FIG. 3 is an enlarged side view illustrating the armrest 100 in FIG. 1.

An industrial vehicle according to a preferred embodiment of the present invention will now be described with reference to FIGS. 1 through 3. The present embodiment is applied to a counterbalanced forklift truck in the industrial vehicle (hereinafter referred to as a forklift truck 10). In FIG. 1, an arrow FR indicates a frontward direction of the vehicle and an arrow UP indicates an upward direction of the vehicle.

As shown in FIG. 1, the forklift truck 10 has a hood 12 on a body 11 of the forklift truck 10 to cover a battery or an engine. A seat 13 is placed on the hood 12 and an armrest 100 is placed above the hood 12. An operator sits on the seat 13 and rests his arms on the armrest 100. The seat 13 is fixed on a top surface of the hood 12 by a bolt. A bracket 17 is erected on the top surface of the hood 12. The armrest 100 is installed on the bracket 17. The armrest 100 extends in a front-and-rear direction of the forklift truck 10 at the right side of the seat 13.

Also, a head guard 14 is placed on the body 11 for guarding the operator against falling objects. The head guard 14 includes four pillars 14a and a guard portion which is not shown in the drawing. The pillars 14a are erected on the front and rear sides of the body 11. The guard portion is supported by the pillars 14a. A counterweight 18 is placed in the back of the hood 12 on the body 11. The hood 12 is pivotally installed on the counterweight 18 through a hinge 15. The hinge 15 serves as a fulcrum when the hood 12 is opened and closed to the body 11.

Now, the structure of the armrest 100 will be described with reference to FIGS. 2 and 3. As shown in FIGS. 2 and 3, the armrest 100 includes a base member 110 and a rest member 120 that is installed on the base member 110. A pad portion 130 is installed on the rest member 120. The pad portion 130, for example, has a cushioning performance. The pad portion 130 includes a palm pad 132 and an arm pad 134. The operator mainly rests his palm on the palm pad 132 and his arm on the arm pad 134.

Also, four operating levers are placed on the base member 110 in front of the rest member 120. The operating levers include a first operating lever 141, a second operating lever 142, a third operating lever 143 and a fourth operating lever 144. In the claimed invention, the first operating lever 141, the second operating lever 142, the third operating lever 143 and the fourth operating lever 144 each correspond to an operating member. Note that a different operating lever from these operating levers may be placed on the rest member 120. The first operating lever 141 serves as a lift lever for raising and lowering a fork which is not shown in the drawing. The second operating lever 142 serves as a tilt lever for tilting a mast, which is not shown in the drawing, frontward and rearward. Each of the third operating lever 143 and the fourth operating lever 144 is an attachment lever for activating an attachment which is not shown in the drawing.

Each operating lever has an operating knob (that corresponds to an operating portion in the claimed invention) and is a uniaxial type where the operating knob is operated in the front-and-rear direction. In addition, each operating lever is in a small-sized shape so as to operate with the operator's finger, what is called, a mini lever. Therefore, a stroke distance of the operating lever and a distance between the operating levers are relatively small. Thereby, in comparison with a large-sized operating lever, the operating levers (141, 142, 143 and 144) can be operated by a slight movement of an operator's hand even if the operator's arm is rested on the armrest 100. Also, the associated operating knob of each operating lever is substantially in a round shape. When the operator operates the first operating lever 141, the operator moves a first operating knob 141a of the first operating lever 141 frontward or rearward, for example, by having the first operating knob 141a between the operator's thumb and index finger. When the first operating knob 141a is operated frontward, the fork is lowered. When the first operating knob 141a is operated rearward, the fork is raised.

Also, in the present embodiment, each operating knob of the above-described operating levers 141, 142, 143 and 144 is arranged in an arched line L, whose center is a reference point P and whose radius is substantially equivalent to the length of the operator's arm, substantially at equal intervals. An operational orbit of the operator's hand is formed in the arched line L, and the reference point P of the arched line L is located on the rest member 120 of the armrest 100. The rest member 120 is formed to be widened in a width direction of the vehicle toward the front end of the vehicle. The reference point P corresponds to a position of the operator's elbow in a state that the operator's arm is rested on the pad 130. In the claimed invention, the reference point P corresponds to a predetermined reference point and the arched line L corresponds to an arched line. Such an arrangement of the operating levers 141, 142, 143 and 144 corresponds to a structure that at least two operating members each have an operating portion and that the operating portions are arranged along operational orbit of an operator's hand in a state that the operator's arm is rested on the armrest. The arrangement of the operating levers 141, 142, 143 and 144 also corresponds to a structure that at least two operating members each have an operating portion and that the operating portions are arranged in an arched line whose center is located at a predetermined reference point on the armrest.

Thus, if the operational orbit of the operator's hand is formed by pivoting the operator's hand around the operator's elbow in a state that the operator's arm is rested on the armrest, the arched line L substantially corresponds to the operational orbit of the operator's hand. Therefore, the arrangement of the operating knobs of the operating levers 141, 142, 143 and 144 is harmonized with the movement of the operator's hand and fingers.

Note that at least the operating knobs of the operating levers 141, 142, 143 and 144 require arranging in the arched line L. In the present embodiment, a portion for installing each operating lever (or a lower end of each operating lever) is arranged in the arched line L.

As described above, in the present embodiment, the operating knobs of the operating levers 141, 142, 143 and 144 are structured so as to arrange in the arched line L. This structure enables the operating levers 141, 142, 143 and 144 to be reasonably arranged in harmony with the movement of the operator's hand and fingers in a state that the operator's hand is rested on the armrest. Therefore, the fatigue of the operator is effectively reduced. Even if the entire operator's arm is moved when the operator's hand is moved along the operational orbit, the operator's arm is securely held on the rest member 120 without being dropped off the rest member 120. Also, in the present embodiment, since each of the operating levers 141, 142, 143 and 144 is in a small-sized shape (or a mini lever) so as to be operated with the operator's fingertip, in comparison with a large-sized operating lever, the stroke distance of the operating lever and the distance between the operating levers are relatively small. Therefore, even if the operator's arm is rested on the armrest, the operating levers 141, 142, 143 and 144 are operated by the slight movement of the operator's hand. Thereby, the fatigue of the operator is furthermore reduced.

In the present embodiment, the following alternative embodiments are also practiced.

In the above-described embodiment, each operating knob of the four operating levers 141, 142, 143 and 144 is arranged in the arched line L. The number of the operating knobs that are arranged in the arched line L is not limited to four. In alternative embodiments to the preferred embodiment, two or three main operating knobs of the four operating knobs are arranged in the arched line L.

In the above-described embodiment, the portion for installing each operating lever is arranged in the arched line L. In another alternative embodiment to the preferred embodiment, the portion for installing each operating lever (or the lower end of each operating lever) is not arranged in the arched line L.

In the above-described embodiment, the operating levers 141, 142, 143 and 144 each function as an operating member. In alternative embodiments to the preferred embodiment, operating buttons each function as an operating member in place of the operating levers.

In the above-described embodiment, the operating levers 141, 142, 143 and 144 are arranged in front of the rest member 120. In another alternative embodiment to the preferred embodiment, these operating levers are arranged on a panel that is separately arranged from and in front of the armrest 100.

Figure 6:
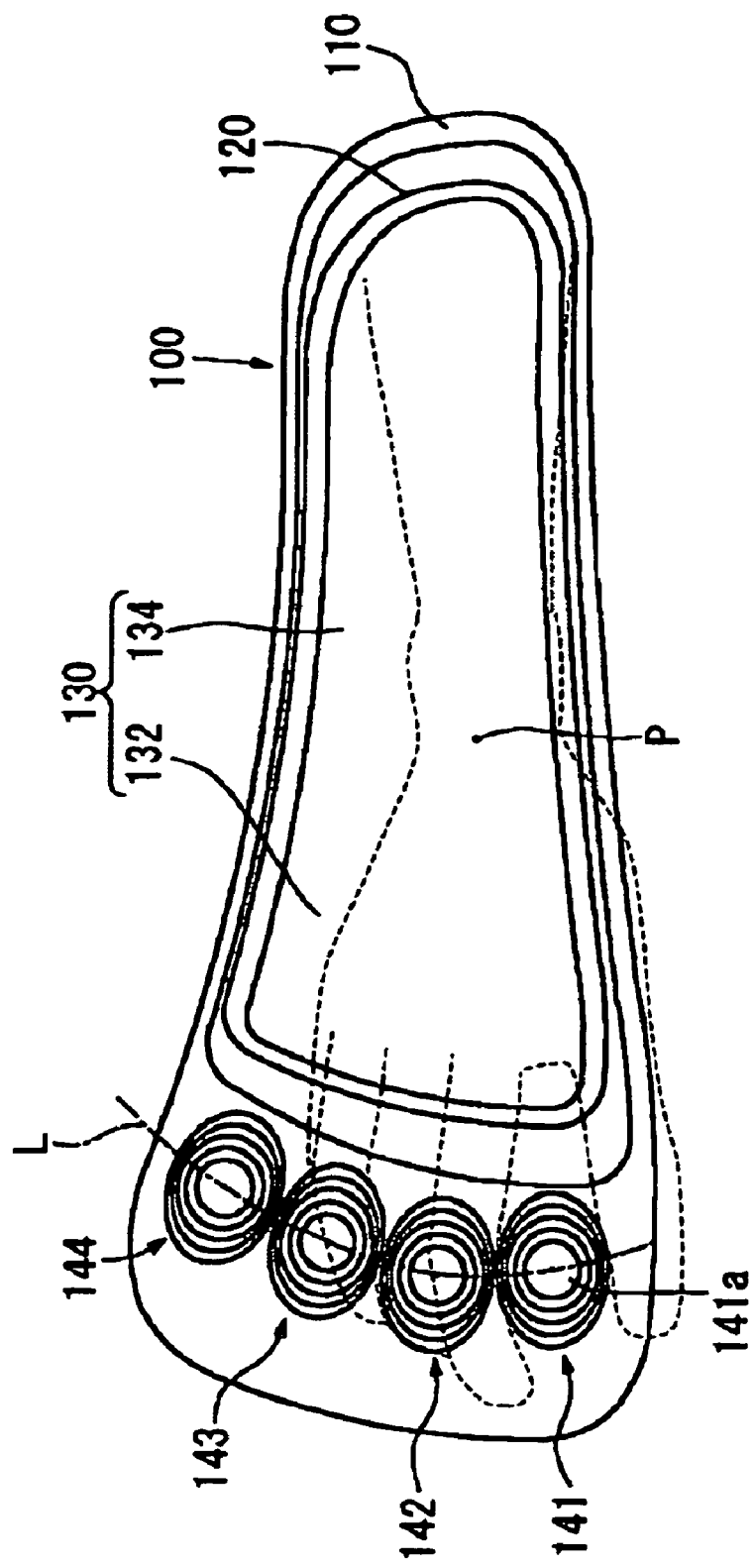
FIG. 6 is a plane view illustrating an operation of an armrest 100 according to another embodiment.

In the above-described embodiment, the reference point P and the arched line L are set in a such manner that the operational orbit of the operator's hand is formed by pivoting the operator's hand around the operator's elbow in a state that the operator's arm is rested on the armrest. In alternative embodiments to the preferred embodiment, however, as shown in FIG. 6, a reference point and an arched line are set in a such manner that an operational orbit of an operator's hand is formed by pivoting the operator's hand around an operator's wrist in a state that the operator's arm is rested on the armrest. Furthermore, a reference point and an arched line are set in a such manner that an operational orbit of an operator's hand is formed by compound movement of the operator's elbow and wrist in a state that the operator's arm is rested on the armrest.

In the above-described embodiment, each operating knob of the operating levers 141, 142, 143 and 144 is substantially in a round shape. The shape of the operating knob is not limited to the round shape. Another alternative embodiment to the preferred embodiment will be described with reference to FIGS. 4 and 5.

Figure 4:
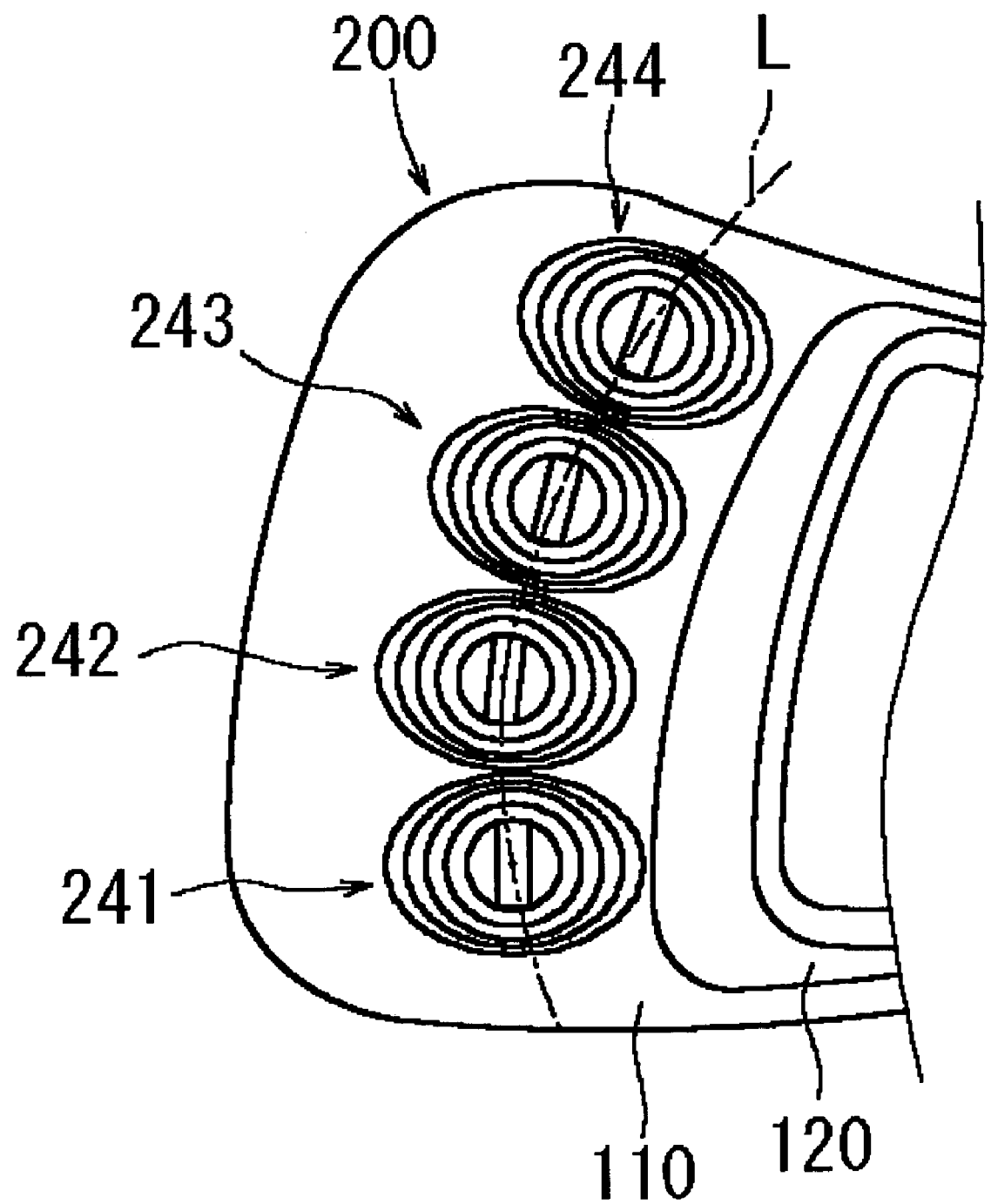
FIG. 4 is a partially enlarged plane view illustrating an armrest 200 according to another preferred embodiment of the present invention.
Figure 5:
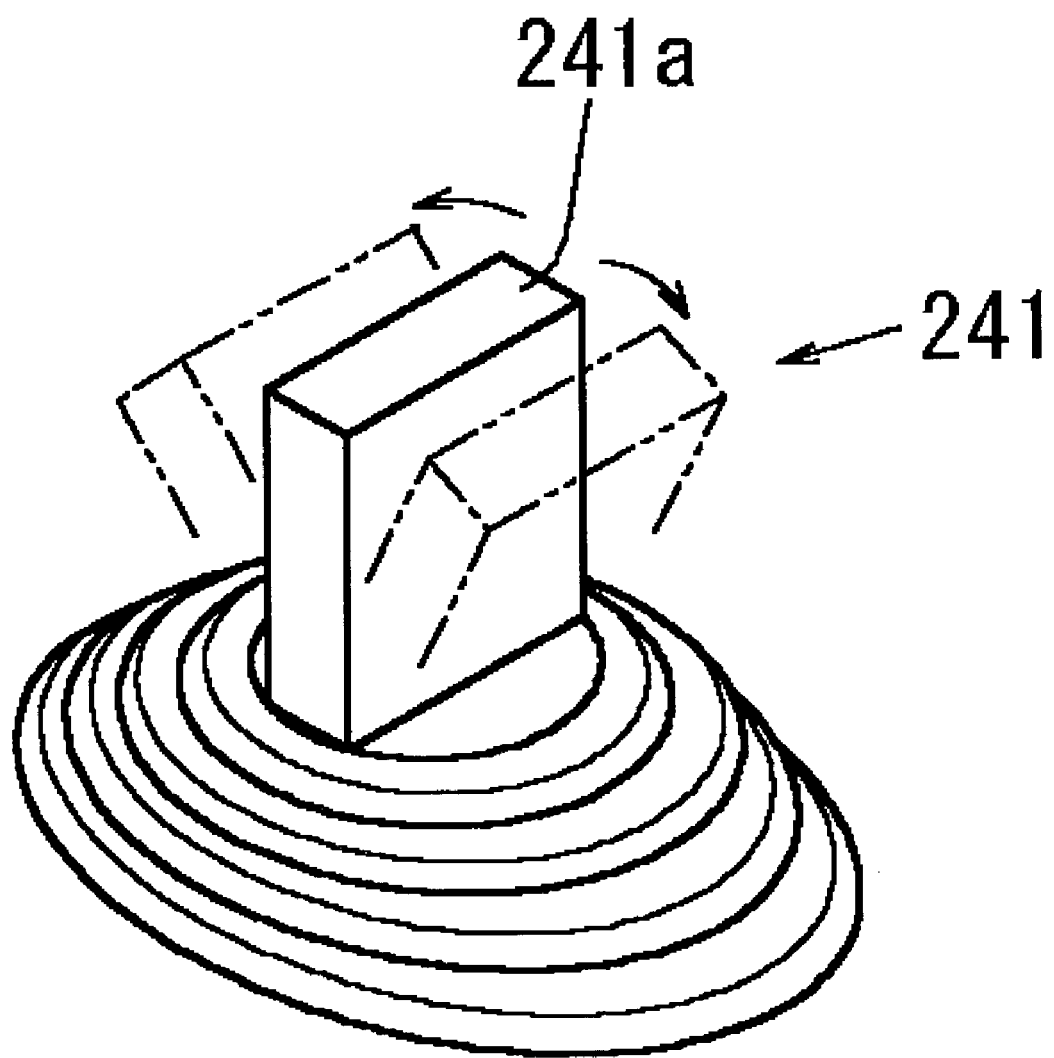
FIG. 5 is an enlarged perspective view illustrating an operating lever 241 in FIG. 4.

As shown in FIGS. 4 and 5, a fifth operating lever 241, a sixth operating lever 242, a seventh operating lever 243 and an eighth operating lever 244 are arranged on an armrest 200 and each lever functions as an operating member. Each operating knob of the operating levers 241, 242, 243 and 244 is substantially in a flat shape. The operating levers 241, 242, 243 and 244 are arranged in an arched line L, whose center is a reference point P and whose radius is substantially equivalent to the length of the operator's arm, substantially at equal intervals as well as the operating levers 141, 142, 143 and 144. Each of the operating levers 241, 242, 243 and 244 has an operating knob and is a uniaxial type where the operating knob is operated in the front-and-rear direction. In addition, the operating lever is a mini lever so as to be operated with the operator's finger. When the operator operates the fifth operating lever 241, the operator moves a fifth operating knob 241a of the fifth operating lever 241 frontward or rearward, for example, by having a flat portion of the fifth operating knob 241a between the operator's thumb and index finger. Therefore, such a structured armrest 200 is effective to reduce the fatigue of the operator as well as the armrest 100 according to the above-described preferred embodiment.

In the above-described embodiment, the present invention is applied to a counterbalanced forklift truck 10 in the industrial vehicle. In alternative embodiments to the preferred embodiment, however, the present invention is applied to a forklift truck such as a reach forklift truck or an order picking truck. Furthermore, the present invention is applied to every kind of construction equipment (or construction vehicle).

Therefore, the present examples and embodiments are to be considered as illustrative and not restrictive and the invention is not to be limited to the details given herein but may be modified within the scope of the appended claims.

What is claimed is:

1. An industrial vehicle to be operated by an operator, comprising:

an armrest extending in a front-and-rear direction of the vehicle, the armrest having a substantially flat base member and a rest member that is installed on the base member, the rest member having a palm pad and an arm pad, and the rest member being substantially continuously formed to be widened in a width direction of the vehicle toward a front end of the vehicle; and a plurality of operating members arranged in front of the base member, at least two of the operating members each having an operating portion, wherein all of the operating members are arranged in an operational orbit configuration that includes the operating portions arranged in an arched row on a lateral portion of the rest member and the arched row is spaced an operational distance from a predetermined pivot reference point on the rest member and the operating portions are disposed within the proximity of the operator's finger tips when the operator's arm is on the arm pad.

2. The industrial vehicle according to claim 1, wherein each of the operating members is an operating lever for operation by an operator's fingertip.

3. The industrial vehicle according to claim 1, wherein each operating portion is an operating knob that is operated in the front-and-rear direction.

4. The industrial vehicle according to claim 3, wherein the operating knob is substantially in a round shape.

5. The industrial vehicle according to claim 3, wherein the operating knob is substantially in a flat shape.

6. The industrial vehicle according to claim 3, wherein at least three of the operating members each have an operating knob, the operating knobs being arranged substantially at equal intervals.

7. The industrial vehicle according to claim 1, wherein the operational orbit is formed by pivoting an estimated hand position around an estimated elbow position.

8. The industrial vehicle according to claim 1, wherein the operational orbit is formed by pivoting an estimated hand position around an estimated wrist position.

9. The industrial vehicle according to claim 1, wherein the industrial vehicle is a forklift truck.

10. The industrial vehicle according to claim 1, wherein the predetermined pivot reference point corresponds to a position of an estimated elbow position on the rest member, a radius of the arched line substantially corresponding to estimated arm length.

11. The industrial vehicle according to claim 1, wherein the predetermined pivot reference point corresponds to a position of an operator's wrist, a radius of the arched line substantially corresponding to a length of an estimated hand position.

* * * * *